United States Patent [19]

Guthrie

[11] 4,414,294
[45] Nov. 8, 1983

[54] ELECTRICALLY INSULATING AND SEALING FRAME

[75] Inventor: Robin J. Guthrie, East Hartford, Conn.

[75] Assignee: The United States of America as represented by the U.S. Department of Energy, Washington, D.C.

[21] Appl. No.: 424,111

[22] Filed: Sep. 27, 1982

[51] Int. Cl.³ ............................................. H01M 2/08
[52] U.S. Cl. ..................................... 429/35; 429/185
[58] Field of Search ...................... 429/34, 35, 37, 185

[56] References Cited

U.S. PATENT DOCUMENTS

| | | | |
|---|---|---|---|
| 3,994,748 | 11/1976 | Kunz et al. | 429/34 |
| 4,079,171 | 3/1978 | Marianowski et al. | 429/46 |
| 4,212,929 | 7/1980 | Grevstad et al. | 429/37 |
| 4,276,355 | 6/1981 | Kothmann et al. | 429/35 |

OTHER PUBLICATIONS

DOE/ET 15440-2, Development of Molten Carbonate Fuel Cell Power Plant Technology, Quarterly Progress Report No. 2, Aug. 1980.

Primary Examiner—Donald L. Walton
Attorney, Agent, or Firm—Hugh W. Glenn; Robert J. Fisher; Richard G. Besha

[57] ABSTRACT

A combination gas seal and electrical insulator having a closed frame shape interconnects a fuel cell stack and a reactant gas plenum of a fuel cell generator. The frame can be of rectangular shape including at least one slidable spline connection in each side to permit expansion or contraction consistent with that of the walls of the gas plenum and fuel cell stack. The slidable spline connections in the frame sides minimizes lateral movement between the frame side members and sealing material interposed between the frame and the fuel cell stack or between the frame and the reactant gas plenum.

7 Claims, 4 Drawing Figures

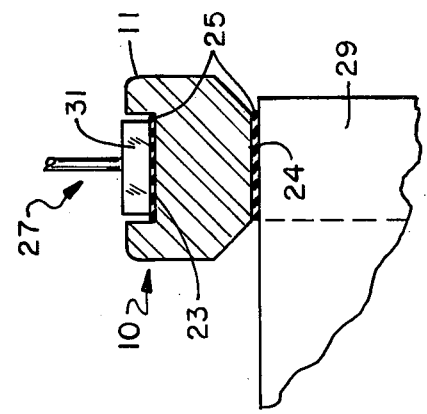
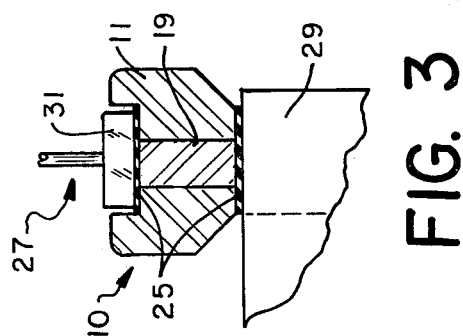
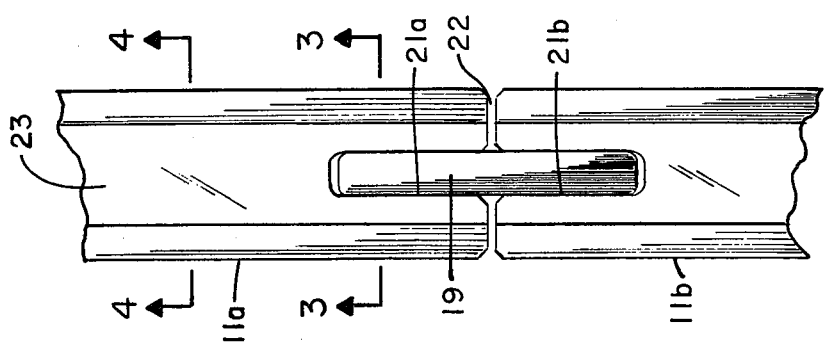

ELECTRICALLY INSULATING AND SEALING FRAME

CONTRACTUAL ORIGIN OF THE INVENTION

The United States Government has rights in this invention pursuant to Contract No. DE-AC01-79ET15440 between the Department of Energy and United Technologies Corporation.

BACKGROUND OF THE INVENTION

The present invention relates to the connection of reactant gas plenums or manifolds to individual stacks of fuel cells used in the production of electrical energy from gaseous fuels. The invention is particularly directed to electrically insulative sealing members for interpositioning between the cell stack and the reactant gas supply.

In an effort to develop new sources of electrical power, fuel cells have received considerable study and development effort. Individual cells of relatively low electrical potential and capacity are arranged in large fuel cells stacks. Several fuel cell stacks may be combined in a module or assembly within a single containment vessel for manufacture and shipping to a power plant site.

The individual stacks of fuel cells must be provided with reactant gases for their operations. Fuel gases such as hydrogen or producer gas from the gasification of solid carbonaceous material can be employed. In addition, an oxidant gas such as oxygen or air must also be provided for reaction opposite the fuels. The manifolds carrying these reactant gases must be electrically insulated from the fuel cell stacks and connected to the stacks in a leak type manner. The high temperature and corrosive environment of molten carbonate fuel cells present difficult problems in providing these manifold connections. A particular difficult situation occurs when the sealing medium has a different coefficient of thermal expansion than that of the reactant gas manifold, plenum or the fuel cell stack.

Therefore it is an object of the present invention to provide an electrical insulator and sealing arrangement for use between a reactant gas plenum and a fuel cell stack.

It is a further object to provide an electrical insulator and seal capable of expanding and contracting consistent with the thermal expansion and contraction of the reactant gas plenum and fuel cell stack.

It is a further object to provide a gas seal between a reactant gas plenum and fuel cell stack which accommodates thermal expansion and contraction with minimum lateral movement of sealing surfaces.

One other object is to provide a reactant gas plenum seal that minimizes gas leakage resulting from thermal cycling of the fuel cell stack.

In accordance with the present invention, a combination electrical insulator and gas seal is provided for use between a reactant gas plenum and a stack of fuel cells within a fuel cell generator module. The combination insulator and seal includes a plurality of electrically insulative segments including segments with angular portions and segments with elongated portions arranged with ends in near abutment to form a closed frame between the reactant gas plenum and the fuel cell stack. Slidable splines are provided for connecting adjacent segments together in the frame configuration. Sealing surfaces are provided on opposite faces of the frame for engaging the reactant gas plenum walls and the fuel cell stack to minimize gas leakage from the plenum.

In more specific aspects of the invention, the spline connections between adjacent segments include keys which extend across the thickness of the electrically insulative segments and engage the sealing surfaces at the opposite faces of the frame. The spline keys slidably fit into slots defined between forked tines in adjacent end portions of the segments to form a labyrinth path minimizing gas leakage.

The seal and insulating frame is illustrated of rectangular shape consistent with rectangular adjacent portions of the gas plenum and fuel cell stack. The frame includes at least one slidable spline connection in each of the four sides such that expansion and contraction of the gas plenum walls and fuel cell stack can be faithfully tracked with minimum lateral motion across the sealing faces of the frame. This is of considerable importance and permits advantageous selection of the electrically insulated frame of a material having a substantially different coefficient of thermal expansion and contraction than that of the members to which it seals.

BRIEF DESCRIPTION OF THE DRAWINGS

The present invention is illustrated in the accompanying drawings.

FIG. 2 is an enlarged view of a slidable spline joint in the frame of FIG. 1.

FIG. 3 is a sectional view along lines 3—3 of FIG. 2, FIG. 3 also illustrates the sealing arrangement between fragmented portions of a fuel cell stack and reactant gas plenum.

FIG. 4 is a sectional view along lines 4—4 of FIG. 2 showing fragmented portions of the fuel cell stack and reactant gas plenum.

DETAILED DESCRIPTION OF THE PREFERRED EMBODIMENT

Figure 1:
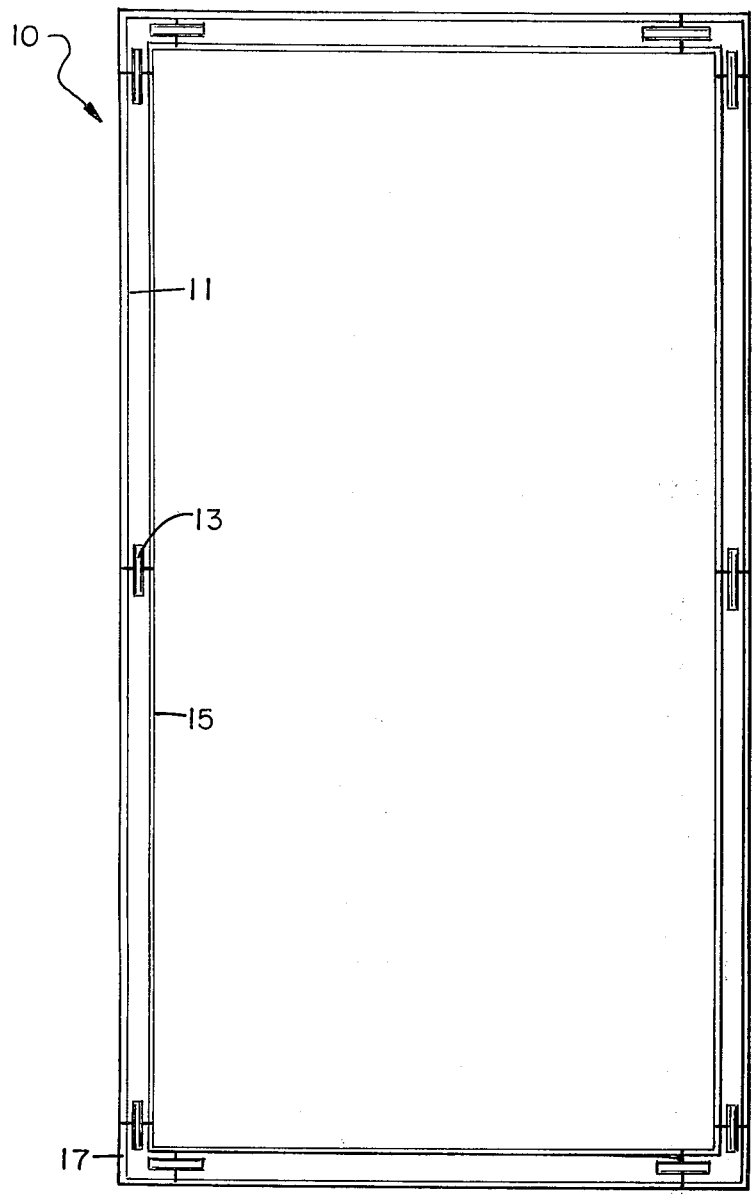
FIG. 1 is a plan view of an electrically insulative frame.

Reactant gas manifolds can be arranged to separately provide fuel gas and oxidant gas to a plurality of fuel cell stacks arranged in modules within containment vessels. During operation of a high temperature fuel cell stack, reactant gas is provided to the stack through separate manifold and plenums for the oxidant and fuel gases. Several fuel cell stacks can be assembled as a module within a common pressure chamber and provided with suitable plenum and manifold connections within the chamber to minimize reactant gas leakage. Separate plenums may be positioned at opposite sides or in some other convenient relationship to the fuel cell stack.

Gas plenums are positioned between each manifold and fuel cell stack for admitting the reactant gas to the individual cells of the stack. The combination seal and electrical insulator illustrated in the drawings prevents gas leakage and electrical shorting at the plenum to fuel cell stack connection.

The plenum opening generally corresponds in size and shape to the stack openings for admitting reactant gas. Although various shapes of plenums can be selected it will be seen that a rectangular shape can be advantageously employed in combination with the rectangular insulator and sealing frame as illustrated and described herein.

In FIG. 1 a combination electrical insulator and reactant gas seal is illustrated. The insulator-seal-combination is presented as a rectangular frame 10 having a plurality of segments 11 interconnected by slidable spline joints or connection 13. Segments 11 include both straight sections 15 and angular sections 17 to permit their arrangement into a rectangular frame.

Frame 10 includes at least one slidable spline connection 13 in each of its four sides between adjacent sections. The splines allow expansion and contraction resulting from temperature changes of the reactant gas plenum and fuel cell stack with minimum lateral movement in respect to any side of the rectangular frame. Frame 10 can faithfully follow dimensional changes in the gas plenum or fuel cell stack portion by longitudinal movement parallel to the length of its four sides. Accordingly, lateral sideways movement across sealing surfaces facing the plenum or fuel cell stacks with accompanying damage can be minimized or avoided.

Although frame 10 is illustrated in the preferred rectangular shape, it will be clear that other shaped frames having a sufficient number of slidable spline connections also can be provided to closely track dimensional changes in the adjacent stack or plenum. Clearly a square frame can be selected. In addition, various polygonal or even a circular shape can be adapted for use with appropriate distribution of slidable spline connections between adjacent segments. Although frame 10 is illustrated with both individual straight sections 11 and corner or angular sections 17, it will be clear that various arrangements combining these individual members can be employed provided at least one slidable spline connections is included in each of the sides of the insulator sealing frame.

In FIG. 2 an enlarged slidable spline connection is illustrated. Adjacent frame segments 11a and 11b are in near abutment with a spline key 19 fitted into oppositely facing keyways 21a and 21b formed within the adjacent end portions of segments 11a and 11b. As is illustrated in FIGS. 3 and 4, spline key 19 is flush with outer surfaces of the segments to facilitate sealing of the reactant gas within the plenum.

In FIGS. 3 and 4 frame 10 is illustrated as an electrical insulator and sealing member between the reactant gas plenum 27 and the fuel cell stack 29. Gaskets 25 seat along the face surface 24 adjacent the fuel cell stack and the recess surface 23 illustrated in alignment with a foot portion 31 of the reactant gas plenum. The gasket materials will also extend under angular segments 17 of the frame insulator to form a complete seal about the periphery of the reactant gas plenum. Various known gasket materials can be employed consistent with the seal embodiment. For instance in a molten carbonate fuel cell stack a yttria stabilized zirconia felt may be used.

In FIG. 3 it is seen that the thickness of spline key 19 is sufficient to extend between gasket material 25 on the recess surface 23 and the opposite face surface 24 of frame 10 to provide a seal even at the spline connections. Moreover, in reference to FIG. 2 it is seen that only a labyrinth path between the slidably fitted spline key 19 and the keyway slots 21a and 21b is available for escape of gas from the inside of the reactant gas plenum 27. Accordingly, this configuration provides a labyrinth seal at the spline connections even when expansion of the plenum or fuel cell stack causes a gap 22 (FIG. 2) between the adjacent segments 11a and 11b of frame 10.

The electrically insulating and gas sealing frame described herein is of considerable advantage in high-temperature molten carbonate fuel cell arrangements where components of different coefficients of thermal expansion are employed. Generally the manifold, plenum and fuel cell stack are of suitable corrosion resistant metals while the electrically insulative frame is of an electrically insulative material such as alumina. These materials may have substantial differences in thermal expansion that can be accomodated in the spline connections of the insulative frame structure. The rectangular configuration of frame 10 with at least one spline connection in each of its four side members permits sealing expansion and contraction in each direction. Moreover, the expansion and contraction of gasket sealing material 25 at the opposite face surfaces of frame 10 will be primarily along the length of the four sides of rectangular frame 10 to minimize gasket damage or interruption of sealing contact with the opposing face surfaces.

Therefore, it will be clear that the present invention provides a combination electrically insulative and sealing frame for positioning between a reactant gas plenum and a fuel cell stack in an environment that may encounter large variations in temperature. The electrically insulative frame is provided with spline-like sealing connections between a plurality of segments for following the expansion of adjacent members to which it seals. In addition, the frame minimizes lateral movement across gasket material to reduce risk of gasket damage and leakage of reactant gases. Although the spline connections expand to form gaps between frame segments, spline keys fitted into keyways extend across their thickness between gasket material to minimize reactant gas leakage. Further, reactant gas leakage can be limited by assemblying a plurality of fuel cell stacks as a module within a common chamber maintained at a pressure near to that of the reactant gas.

Although the present invention has been described in terms of a specific embodiment it will be clear that various changes in the materials and configurations selected can be made by one skilled in the art within the scope of the appended claims.

The embodiments of this invention in which an exclusive property or privilege is claimed are defined as follows:

1. A combination electrical insulator and gas seal for use between a reactant gas plenum and a fuel cell stack comprising:
   a plurality of electrically insulative segments including segments with angular portions and segments with elongated portions arranged with adjacent ends in near abutment to form a closed frame between the plenum and fuel cell stack;
   spline means for slidably connecting the segments together to form the frame configuration;
   sealing means at opposite face surfaces of the frame engaging the reactant gas plenum and fuel cells stack for minimizing gas leakage from the plenum.

2. The combination of claim 1 wherein said spline means comprises keys which extend across the thickness of the electrically insulative segments and engage the sealing means at both the reactant gas plenum and the fuel cell stack to minimize reactant gas leakage from the plenum.

3. The combination of claim 1 wherein said spline means in combination with said sealing means in adjacent segment ends comprise a labyrinth path for minimizing gas leakage.

4. The combination of claim 1 wherein the reactant gas plenum and frame have matching portions of rectangular shape.

5. The combination of claim 1 wherein the closed frame defines a rectangular area wherein each peripheral side of the closed frame includes at least one spline means slidably interconnecting adjacent electrically insulative segments.

6. The combination of claim 1 wherein said electrically insulative segments are of alumina and include a lengthwise recess surface and wherein said sealing means includes elongated strips of gasket material disposed on said recessed surface.

7. The combination of claim 1 wherein the electrically insulative segments are of a material having a substantially different coefficient of thermal expansion than that of the reactant gas plenum.

* * * * *